(12) United States Patent
Beckert et al.

(10) Patent No.: US 11,012,593 B2
(45) Date of Patent: May 18, 2021

(54) FAULT TOLERANT DISPLAY

(71) Applicant: Microsoft Technology Licensing, LLC, Redmond, WA (US)

(72) Inventors: Richard D. Beckert, Issaquah, WA (US); Phillip G. Hays, Woodinville, WA (US); Steven P. Maillet, Redmond, WA (US); Andrew W. Lovitt, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 16/008,595

(22) Filed: Jun. 14, 2018

(65) Prior Publication Data

US 2018/0295261 A1 Oct. 11, 2018

Related U.S. Application Data

(63) Continuation of application No. 13/671,570, filed on Nov. 8, 2012, now abandoned.

(51) Int. Cl.
*B60K 35/00* (2006.01)
*H04N 5/213* (2006.01)
*H04N 7/18* (2006.01)

(52) U.S. Cl.
CPC ............. *H04N 5/213* (2013.01); *H04N 7/181* (2013.01)

(58) Field of Classification Search
CPC ........ H04N 5/213; H04N 7/181; H04N 7/183; B60R 1/00; B60R 2001/1253
See application file for complete search history.

(56) References Cited

U.S. PATENT DOCUMENTS

| 7,456,847 | B2 | 11/2008 | Krajec |
| 8,451,107 | B2 | 5/2013 | Lu et al. |
| 2004/0061780 | A1 | 4/2004 | Huffman |
| 2004/0202380 | A1 | 10/2004 | Kohler et al. |
| 2005/0093975 | A1 | 5/2005 | Hamdan et al. |

(Continued)

FOREIGN PATENT DOCUMENTS

| CN | 1953553 A | 4/2007 |
| CN | 101442618 A | 5/2009 |

(Continued)

OTHER PUBLICATIONS

"MyFord Touch", Retrieved at: <<http://media.ford.com/images/10031/MyFordTouch_July10.pdf>>, Sep. 27, 2010, 12 pages.

(Continued)

*Primary Examiner* — Patrick Demosky
(74) *Attorney, Agent, or Firm* — Medley, Behrens & Lewis, LLC (57) ABSTRACT

A fault tolerant display displays safety information on a display shared with an infotainment system even if the processor or software of the infotainment system is unresponsive. The display can be a streaming video from a rear view camera mounted on a vehicle. The safety displayed can be triggered by placing the vehicle in reverse. Failure of the infotainment software and/or processor can be detected by a policy enforcing module that switches to a backup display that streams video directly from the camera in the event of failure of the infotainment processor.

20 Claims, 3 Drawing Sheets

(56) References Cited

U.S. PATENT DOCUMENTS

| | | | |
|---|---|---|---|
| 2006/0125919 A1* | 6/2006 | Camilleri | H04N 7/183 348/148 |
| 2006/0164230 A1* | 7/2006 | DeWind | B60K 35/00 340/461 |
| 2007/0046680 A1 | 3/2007 | Hedrick et al. | |
| 2008/0069404 A1 | 3/2008 | Lee et al. | |
| 2008/0094413 A1 | 4/2008 | Autor et al. | |
| 2008/0252489 A1 | 10/2008 | Naimer et al. | |
| 2010/0312630 A1* | 12/2010 | Krutchik | G06Q 30/0235 705/14.35 |
| 2011/0001614 A1 | 1/2011 | Ghneim | |
| 2011/0188122 A1 | 8/2011 | Habibi et al. | |
| 2012/0002051 A1 | 1/2012 | Nix | |
| 2012/0154591 A1* | 6/2012 | Baur | B60R 1/00 348/148 |
| 2012/0162427 A1 | 6/2012 | Lynam | |
| 2012/0218412 A1* | 8/2012 | Dellantoni | G01C 21/3602 348/148 |
| 2012/0221168 A1 | 8/2012 | Zeng et al. | |
| 2014/0125802 A1 | 5/2014 | Beckert et al. | |
| 2014/0139670 A1* | 5/2014 | Kesavan | G06K 9/00791 348/148 |
| 2014/0168428 A1* | 6/2014 | Nefedov | H04N 7/18 348/143 |
| 2014/0368653 A1* | 12/2014 | Wang | H04N 1/00209 348/148 |

FOREIGN PATENT DOCUMENTS

| | | |
|---|---|---|
| CN | 101945256 A | 1/2011 |
| EP | 2917073 A1 | 9/2015 |
| WO | 03100614 A2 | 12/2003 |

OTHER PUBLICATIONS

Zimmer, et al., "Fault Tolerant Network Routing Through Software Overlays for Intelligent Power Grids", Retrieved at: <<http://ieeexplore.org/stamp/stamp.jsp?tp=&arnumber=5695646>>, IEEE 16th International Conference on Parallel and Distributed Systems (ICPADS), Dec. 8, 2010, 8 pages.

"Self Recording Cameras—Rearview Mirror Camera", Retrieved at: <<http://www.stungunmikes.com/rearview-mirror-camera.html>>, Nov. 12, 2010, 2 pages.

"The Gentex Solution", Retrieved at: <<http://www.gentex.com/automotive/rear-camera-display-regulation/gentex-solution>>, Retieved Date: Sep. 12, 2012, 2 pages.

"Four-Camera Surround View Driver Assistance Systems", Retrieved at: <<http://www.logicbricks.com/Markets/Automotive/Automotive-Surround-View-DA-Systems.aspx>>, Retrieved Date: Sep. 12, 2012, 1 page.

"International Search Report and Written Opinion for PCT Patent Application No. PCT/US2013/069286", dated Feb. 19, 2014, 8 pages.

"Non-Final Office Action for U.S. Appl. No. 13/671,570", dated Jun. 26, 2015, 17 pages.

"Response to the Non-Final Office Action for U.S. Appl. No. 13/671,570", dated Nov. 27, 2015, 16 pages.

"Final Office Action for U.S. Appl. No. 13/671,570", dated Mar. 7, 2016, 26 pages.

"Response to the Final Office Action for U.S. Appl. No. 13/671,570", dated Aug. 4, 2016, 16 pages.

"Non-Final Office Action for U.S. Appl. No. 13/671,570", dated Jun. 30, 2017, 23 pages.

"Response to the Non-Final Office Action for U.S. Appl. No. 13/671,570", dated Nov. 28, 2017, 9 pages.

"Final Office Action for U.S. Appl. No. 13/671,570", dated Jan. 17, 2018, 26 pages.

"Response to the Final Office Action for U.S. Appl. No. 13/671,570", dated Mar. 18, 2018, 16 pages.

"Advisory Action for U.S. Appl. No. 13/671,570", dated May 15, 2018, 3 pages.

"Office Action for Chinese Patent Application No. 201380069883.5", dated Jul. 29, 2016, 12 pages.

"Response to the Office Action for Chinese Patent Application No. 201380069883.5", dated Dec. 13, 2016, 15 pages.

"Office Action for Chinese Patent Application No. 201380069883.5", dated Mar. 14, 2017, 13 pages.

"Reply to Office Action for Chinese Patent Application No. 201380069883.5", dated Apr. 19, 2017, 6 pages.

"Reply to Office Action for European Patent Application No. 13795386.5", dated Dec. 7, 2015, 10 pages.

"International Preliminary Report on Patentability for PCT Patent Application No. PCT/US2013/069286", dated May 21, 2015, 6 pages.

"Office Action for European Patent Application No. 13795386.5", dated Jun. 16, 2015, 2 pages.

"Office Action for Chinese Patent Application No. 201380069883.5", dated Aug. 17, 2017, 14 pages.

"Intention to Grant for European Patent Application No. 13795386.5", dated Mar. 19, 2018, 42 pages.

"Result of Consultation for European Patent Application No. 13795386.5", Mailed Date: Mar. 12, 2018, 24 pages.

"Notification to Grant Patent Right for Chinese Patent Application No. 2013800069883.5", dated Jan. 22, 2018, 4 pages.

"Reply to Office Action for Chinese Patent Application No. 201380069883.5", dated Aug. 8, 2017, 31 pages.

"Fault Tolerance", Wikipedia, Retrieved at: <<https://en.wikipedia.orgiwiki/Fault_tolerance>>, Retrieved Date: Jun. 14, 2018, 8 pages.

"Patent Certificate for Invention for Chinese Patent Application No. 201380069883.5", May 4, 2018, 2 pages.

* cited by examiner

FAULT TOLERANT DISPLAY

CROSS-REFERENCE TO RELATED APPLICATION

This application is a continuation of U.S. patent application Ser. No. 13/671,570, filed on Nov. 8, 2012, and entitled "FAULT TOLERANT DISPLAY", the entirety of which is incorporated herein by reference.

BACKGROUND

Vehicle collisions are a leading cause of injury and property damage worldwide. One way to increase safety is to reduce the chances of operator error. On-board electronics and in-vehicle information systems are becoming standard in the industry. These systems are able to collect a wide range of information.

SUMMARY

A fault tolerant display can display information from a first source and/or a second source. Fault tolerance is provided by switching to display of backup information from the second source should the first source fail. Failure of the first source includes generation of incorrect information, unresponsiveness within a defined time period, incorrect display of information and failure to display information. The first source can include information from the second source. The information displayed can be safety information. For example, a display can provide safety information such as but not limited to streaming video from one or more cameras mounted on a vehicle. Image overlays designed to increase driver safety can be provided from either the first source or the second source. The first source can provide information from an application processor. Fault tolerance can be provided by switching to backup information from a second source should programs providing information to the fault tolerant display fail. The display can be a shared display area that is shared by the fault tolerant display and another display-generating source. Similarly, information from the second source can be displayed during program boot, when information from the first source is unavailable.

Information from the second source can be displayed independently of the current state of the application processor and/or programs executing on the application processor. The application processor can comprise an infotainment system. The module that detects failure of the first source can be a separate processor or a piece of hardware such as a field programmable gate array (FPGA). Because the fault tolerant module can detect failure of the first source and can switch to displaying backup information from the second source, the information can be displayed even if the first source fails.

The information displayed can be information that displays streaming video from one or more cameras mounted on a vehicle, the one or more cameras capturing at least a portion of a 360 degree field of view surrounding the vehicle. Images from the one or more cameras can be merged or fused to create the displayed streaming video. The streaming video can be displayed within one second of a triggering activity. The triggering activity can be gear change, vehicle movement, a change in position of the steering wheel, a turn signal turning on, a hazard indicator turning on, information received from another application (e.g., navigation or hazard application) or other actions. External logic provided from a field programmable gate array (FPGA) or from special-purpose hardware or from another module or component can provide both dynamic and static hardware overlays of a potential path of the vehicle based on the steering wheel position and/or based on navigation information which can be gathered from "the cloud" or from one or more devices installed or brought into the vehicle. Graphical and textual overlays to assist the operator can be provided. Dynamic overlays from a software application that provides hazard or navigation information can be displayed. For example, based on a steering wheel position or based on navigation information, etc. or a combination thereof, information including a suggested lane to turn into, information concerning whether a vehicle continuing on the indicated trajectory will encounter on-coming traffic, whether a vehicle continuing on the indicated trajectory will proceed in a direction in conformance with input to a navigational application, etc. can be provided on the display.

A policy enforcing module can verify that information provided by the application processor is available, is acceptable and/or is displayed in appropriate areas of the display. The ability to trigger system resets or other failure recovery methods can also be provided. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

In accordance with aspects of the subject matter described herein, a fault tolerant display can be a display that provides information from one or more cameras mounted on a vehicle to help an operator of the vehicle drive safely. For example, the one or more cameras can be cameras that are mounted on a vehicle so as to provide a view of the surroundings behind the vehicle. The video stream captured by the one or more rear view cameras may or may not be processed (e.g., converted from analog to digital, etc.). The video stream captured by one camera may be merged with one or more video streams captured by another camera or cameras. The merged display may be displayed on the fault tolerant display. One or more overlays generated by an application or by hardware can be superimposed on the video stream. Because a vehicle can be shifted into gear (e.g., reverse gear) and/or can start to move in a given direction (e.g., backwards) at any time, including while the vehicle's computer system is booting up or is unresponsive for any reason, software on the main processor of the vehicle's computer system may not be as fast or reliable as wanted. Similarly, the main processor may malfunction while the fault tolerant display is being displayed. In accordance with aspects of the subject matter disclosed herein, a fault tolerant module such as an FPGA, a general processor having a fault tolerant operating system and application running on it, or a piece of special-purpose hardware can be interposed between the application processor's video output and the display. The streaming video from the rear view camera can be merged with video output from the application processor to drive the display when the application processor is operating correctly. When the application processor is unresponsive, the display can switch to output generated directly from the one or more cameras. The output displayed directly from the camera can be merged with overlays provided by the fault tolerant module.

The module interposed between the application processor's video output and the display can be supplied with the vehicle's directional state. If, for example, if the vehicle is in reverse gear or moving backwards, the RVC output modified by static and dynamic overlays can be displayed on the display area (or a portion thereof) otherwise used by the application processor. Overlays can include overlays generated by the application processor or overlays provided by the fault tolerant module. Overlays can be provided or modified by the processor, application or by information or services provided from "the cloud". Overlays can include steering information for turning lines based on input from the steering mechanism of the vehicle. The fault tolerant module can overlay all or part of the RVC display with the application processor's display. The fault tolerant module can overlay all or part of the RVC display with overlays generated by or stored by the fault tolerant module. In response to detecting failure of the application processor, the fault tolerant module can automatically switch the display output to show the RVC display camera along with any appropriate hardware or software overlays generated by or stored by the fault tolerant module within 1 second of the vehicle shifting into reverse gear.

The fault tolerant module can detect when the application processor is unresponsive. Failure of the application processor may be detected by a watchdog timer. A watchdog timer (also called a computer operating properly (COP) timer) is a computer hardware or software timer that triggers a system reset or other corrective action if the application processor, due to some fault condition such as a hang, neglects to regularly service the watchdog. A service pulse can be periodically sent to the application processor. Failure to receive a response can result in some action intended to bring the application processor back to normal operation. Other detection schemes can include receiving continuous data from the processor, detecting whether the application is generating overlay information outside its prescribed zones, etc.

The fault tolerant module can detect if the software based overlays fail quality checks. Failures in formatting can be detected by a policy enforcing module. For example, an application processor display format check can include: parameters for frame rate, line rate, average brightness of the display, number of non-black pixels, number of non-transparent pixels, pixel color statistics, tracking of features in the software generated overlay with the camera input video, etc. Failure of output from the application processor to comply with the parameters can be detected by the policy enforcing module.

Failure of the application processor can be detected by a check field. A check field can be a field inserted into the RVC streaming video sent to the application processor by the fault tolerant module. The check field can be a field that is sent in addition to the RVC streaming video along with the streaming video. The application processor can echo the check field in its display output as received. The application processor can perform an operation on the check field and return the modified check field to the fault tolerant module. The fault tolerant module can verify receipt of the check field and can verify that the check field is in its expected form to determine correct operation of the application processor. If the check field is not received by the fault tolerant module within a specified time frame the fault tolerant module can determine that the application processor is in a fault mode. If the check field is received but is not the expected value, the fault tolerant module can determine that the application processor is in a fault mode. The check field, if incorporated with the streaming video, can be removed before the streaming video is displayed.

Suppose for example that the camera is capable of displaying 640 pixels by 480 pixels. Instead of scaling, some black or white pixels (such as a frame count or a more complex sequence) can be added to the streaming video on the left or the right edge. The application processor may not change these bits. The application processor may add other black or white pixels in well-known locations, and change them at specified rates. The fault tolerant module can sync to the expected patterns in the display output from the application processor, and then blank these pixels in the image sent to the display. If the expected patterns are not received for some number of frames, then the fault tolerant display can switch to direct camera display for areas that might otherwise display software based overlays.

If a failure is detected, some or all of the software based overlays can be disabled by the fault tolerant module. The operator of the vehicle may be notified of the failure of the application processor. The fault tolerant module can display the RVC camera image when the car is in reverse, even if the application processor fails or becomes non-responsive. A negotiation such as a handshake between the fault tolerant module and the application processor can be established to ensure a smooth transition between the RVC display to the application processor driven display and vice versa. A handshake, as the term is used in computing, is an automated process of negotiation. The handshake protocol can dynamically set parameters of a communications channel established between two entities before normal communication over the channel begins.

Fault Tolerant Display

Figure 1:
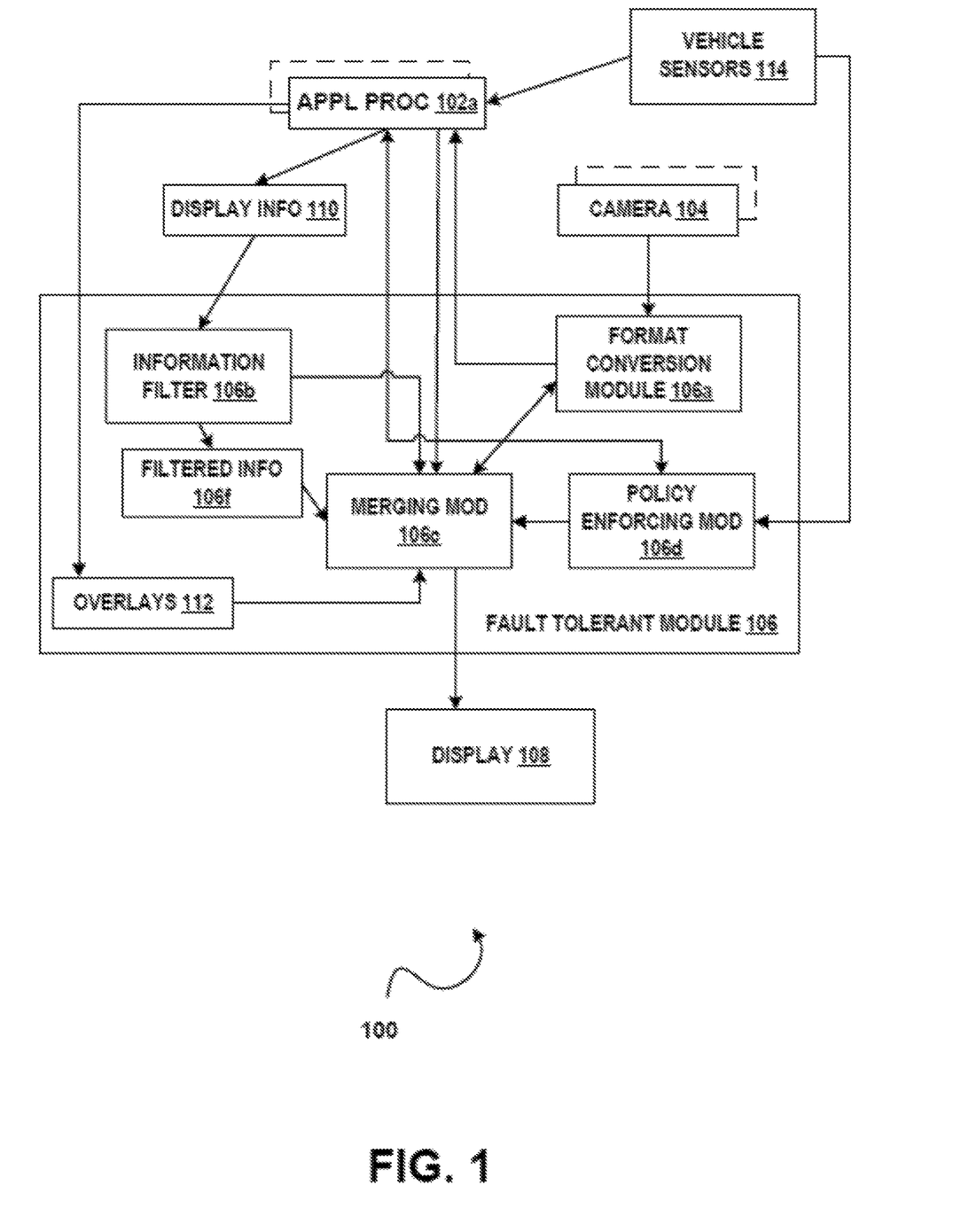
FIG. 1 illustrates an example of a system 100 that provides a fault tolerant display in accordance with aspects of the subject matter described herein.

FIG. 1 illustrates a block diagram of an example of a system 100 that provides a fault tolerant display in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may be incorporated within a vehicle. System 100 or portions thereof include information from a service (e.g., in the cloud) or can include a separate board connected by wired or wireless connections. A cloud computing environment can be an environment in which computing services are not owned but are provided on demand. For example, policy information may reside on multiple devices in a networked cloud and/or data can be stored on multiple devices within the cloud.

System 100 can include any combination of: one or more cameras such as camera 104, etc., one or more fault tolerant modules such as fault tolerant module 106, etc., one or more computing devices having an application processor such as application processor 102a, etc. one or more display areas such as display area 108, etc. and/or one or more gear sensor and/or direction sensors such as vehicle sensors 114.

A computing device (e.g., within a vehicle) can include one or more application processors such as application processor 102a, etc. Application processor 102a can be an in-vehicle infotainment system (IFI). The computing device can include one or more processors, a memory and one or more modules of an infotainment system as described more fully below. Application processor 102a can execute software that receives input from one or more cameras such as camera 104, etc. Application processor 102a can receive input from a format conversion module 106a, described more fully below. Application processor 102a can generate graphical display information such as graphical display information 110. Application processor 102a can generate graphical or descriptive overlays such as overlay information 112.

System 100 can include one or more cameras such as camera 104, etc. Camera 104, etc. can be an analog camera. Camera 104, etc. can be a digital camera. Camera 104, etc. can be a video camera that generates live streaming video. Camera 104, etc. can provide streaming video to module 106. Fault tolerant module 106 can be interposed between an application processor such as application processor 102a, etc. described more fully above and a display 108 described more fully below. Camera 104, etc. can be a camera mounted on a vehicle that captures video of the surroundings of the vehicle. The camera 104, etc. can be a rear view camera that captures video of what is behind the vehicle. Images or streaming video from two or more cameras can be fused or merged to create a single video stream used in the fault tolerant display.

System 100 can include one or more fault tolerant modules (represented by fault tolerant module 106) interposed between one or more cameras, an application processor such as application processor 102a, etc. and a display 108. Fault tolerant module 106 can be a piece of special-purpose hardware, a custom ASIC (application specific integrated circuit), video processing hardware, an FPGA (field programmable gateway array), or a separate processor running fault tolerant software. A fault tolerant module such as fault tolerant module 106 can include any combination of: a video format conversion module such as video format conversion module 106a, an information filter such as an information filter 106b, a display merging module such as display merging module 106c, overlays such as overlays 112 and a policy enforcing module such as policy enforcing module 106d.

A video format conversion module such as video format conversion module 106a can receive streaming video from camera 104, etc. and convert the streaming video to a format that can be received by application processor 102a. For example, if camera 104 is an analog camera, the analog video can be converted to digital video. It will be understood that other conversions are contemplated including but not limited to converting analog video data into digital video data that separates any color into digital values for the primary colors red, green and blue, conversion into other color format schemes, various forms of video compression, contrast enhancement, panning, zooming (optical or digital), scaling, frame rates, frame sizes, resolution, and so on. The information filter such as an information filter 106b can receive information from application processor 102a. Information filter 106b can filter out information that would otherwise be displayed on display 108 to generate filtered information 106f. A display merging module such as display merging module 106c can receive information from the format conversion module 106a, filtered information 106f, overlay information such as overlays 112 and input from policy enforcing module 106d and can merge this information to generate output that is displayed on display 108.

Fault tolerant module 106 can include overlays such as overlays 112. Overlays can be overlays received from application processor 102a and permanently stored in fault tolerant module 106. Overlays can be hardware-generated overlays. Overlays can be software generated overlays generated by fault tolerant module 106, etc. Overlays can be graphical or can be descriptive (e.g., text). Fault tolerant module 106 can include a policy enforcing module such as policy enforcing module 106d. Policy enforcing module 106d can include a watchdog function that periodically sends a request for acknowledgment to application processor 102a. In the event that application processor 102a does not send an acknowledgment within a specified time period, policy enforcer 106d can determine that application processor 102a is in a failure state. Policy enforcing module 106d can also receive information about the status of the vehicle on which camera 104, etc. is mounted. Status information can include information from vehicle sensors 114. Status of the vehicle can include the gear that the vehicle is in (reverse gear, park or drive for automatic transmission vehicles or reverse gear, neutral, first, second, third, fourth, fifth gear, etc. for manual transmission vehicles). Status of the vehicle can include information from the steering mechanism of the car concerning the position of the steering wheel (straight, degree of turn to left or degree of turn to right).

System 100 can include a display such as display 108. Display 108 can display in a central console area of a vehicle. Display 108 can be a fault tolerant display that can display information from two or more sources independently, so that if display information is generated by a first source and the first source fails, the information can be displayed from the second source, as described above. Display 108 can be a shared display that is shared by an infotainment system (first source) and a fault tolerant module (second source) that generates information for display including but not limited to safety information (e.g., operator safety information such as what is behind a vehicle that is in reverse gear). Display 108 can display streaming video from a camera (e.g., an RVC). Overlays can be superimposed over the streaming video and the overlaid streaming video can be displayed. Graphical and/or descriptive (e.g., textual) information can be superimposed on the streaming video. In response to a signal from the fault tolerant module, the display can switch from displaying information from a first source to displaying information from a second source. In response to a signal from the fault tolerant module, the display can switch from displaying merged information from a first source and a second source to displaying information only from a second source. Information from the second source can be displayed independently of the state of the first source. Display 108 can display the streaming video within one second of the vehicle entering reverse gear.

Figure 2:
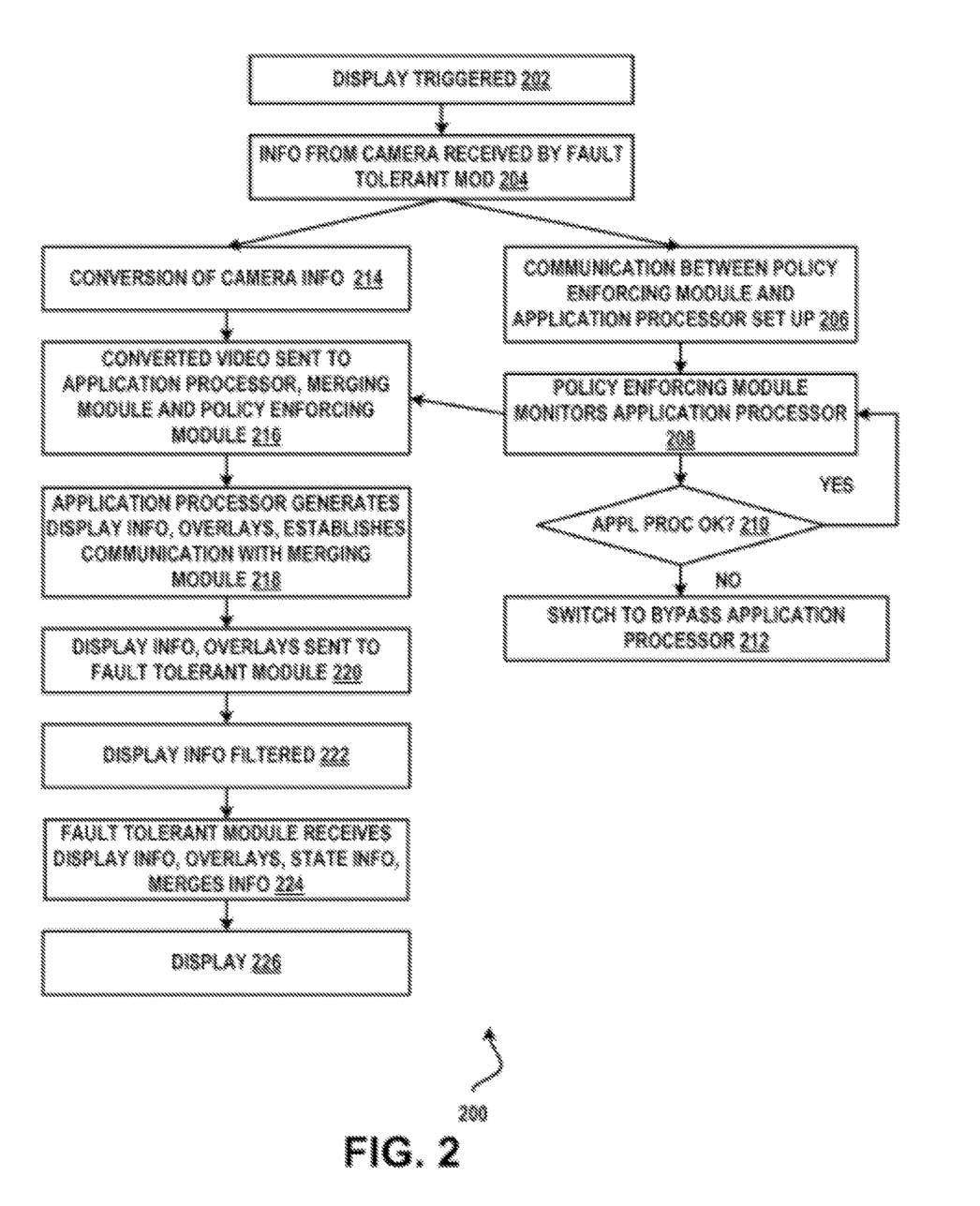
FIG. 2 illustrates an example of a method 200 that provides a fault tolerant display in accordance with aspects of the subject matter disclosed herein.

FIG. 2 illustrates a method 200 that can provide a fault tolerant display in accordance with aspects of the subject matter described herein. The method described in FIG. 2 can be practiced by a system such as but not limited to the one described with respect to FIG. 1. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 the fault tolerant display can be triggered. For example, the display can be triggered by a host vehicle being placed into reverse gear. At operation 204 information from a camera (e.g., rear view camera) can be received by a fault tolerant module. Upon receipt of information from the camera, communication can be established between a policy enforcing module and an application processor at operation 206. At operation 208, as described more fully above, the policy enforcing module can monitor the application processor. The policy enforcing module can monitor the application processor using, for example, a watchdog mechanism as described more fully above. The policy enforcing module can monitor the output of the application processor to determine if the output of the application processor passes quality checks. The policy enforcing module can monitor a check field to determine if the output of the application processor is correct. At operation 210, the policy enforcing module can determine that the application processor is functioning properly or that the application processor has entered a failure state. At operation 212, in response to detecting failure of the application processor, the policy enforcing module can display streaming video directly from the camera (e.g., bypassing the application processor). Overlays generated by or supplied by the fault tolerant module can be superimposed on the streaming video. If the policy enforcing module determines at operation 210 that the application processor is operating correctly, processing can continue at operation 208.

If necessary, the information received by the fault tolerant module at 204 can be converted at operation 214. At operation 216, the information can be sent to the application processor, to the merging module and to the policy enforcing module. At operation 218 the application processor can generate display information, overlays, and can establish communication with the merging module. At operation 220, the display information and the overlays can be sent to the fault tolerant module. At operation 222 the fault tolerant module can filter extraneous information from the information received from the application processor. At operation 224 the fault tolerant module can receive the filtered, overlaid display information, state information from the host vehicle and can merge this information to develop the information that is displayed at operation 226.

Example of a Suitable Computing Environment

Figure 3:
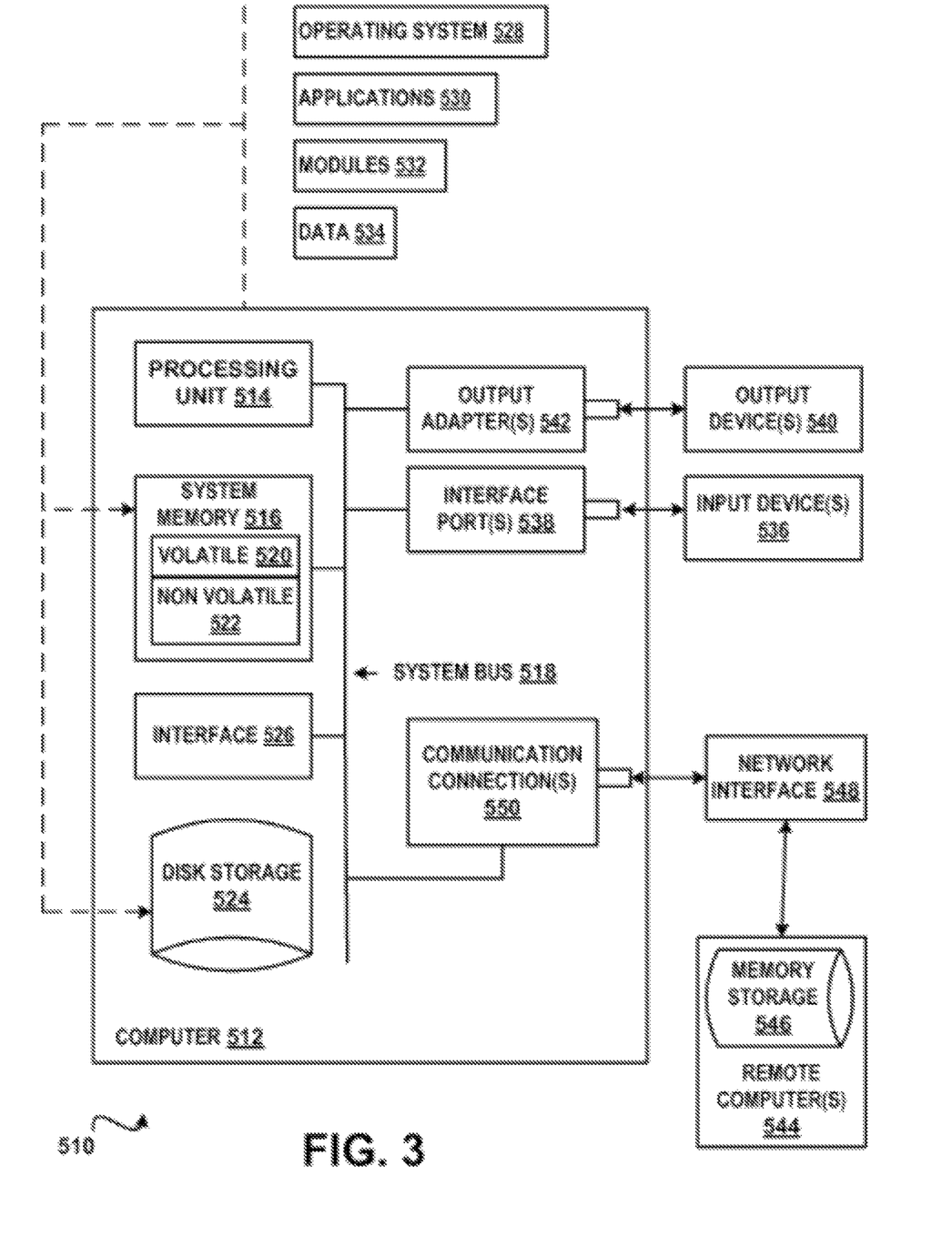
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fault tolerant display system for a vehicle, the system comprising:
   a video camera;
   an in-vehicle infotainment system;
   a display in a cabin of the vehicle; and
   a hardware module separate from the in-vehicle infotainment system, wherein the hardware module is interposed between the video camera, the in-vehicle infotainment system, and the display;
   the hardware module configured to:
      receive streaming video from the video camera;
      merge the streaming video with overlays from the in-vehicle infotainment system to create an overlaid streaming video;
      display the overlaid streaming video on the display in the cabin of the vehicle;
      detect failure of the in-vehicle infotainment system; and
      in response to detecting failure of the in-vehicle infotainment system, switch to display on the display in the cabin of the vehicle the streaming video from the video camera and at least one overlay generated by the hardware module, the streaming video from the video camera and the at least one overlay generated by the hardware module displayed essentially simultaneously on the display.

2. The system of claim 1, wherein failure of the in-vehicle infotainment system is detected by incorrect formatting of display information generated by the in-vehicle infotainment system.

3. The system of claim 2, wherein the incorrect formatting comprises at least one of: incorrect frame rate, incorrect line rate, average brightness of the display lower than a provided threshold for average brightness of the display, a quantity of non-black pixels lower than a provided threshold for non-black pixels, or placement of features generated by the in-vehicle infotainment system failing to correspond to objects in the streaming video.

4. The system of claim 1, wherein failure of the in-vehicle infotainment system is detected by a watchdog timer.

5. The system of claim 1, wherein the overlaid streaming video is displayed within one second of the vehicle shifting into reverse.

6. The system of claim 1, wherein the at least one overlay generated by the hardware module comprises a dynamic overlay of a backup path based on a steering wheel position of the vehicle.

7. The system of claim 1, wherein the at least one overlay generated by the hardware module comprises a dynamic overlay based on hazard detection information.

8. The system of claim 1, wherein the at least one overlay generated by the hardware module comprises a dynamic overlay based on navigation information.

9. The system of claim 1, wherein failure of the in-vehicle infotainment system is detected when the in-vehicle infotainment system is detected to be unresponsive.

10. The system of claim 1, wherein failure of the in-vehicle infotainment system is detected when graphical information received from the in-vehicle infotainment fails a quality check.

11. The system of claim 1, wherein the hardware module is further configured to:
   insert a check field into the streaming video sent to the in-vehicle infotainment system; and
   verify a modified check field received from the in-vehicle infotainment system, the modified check field being returned by the in-vehicle infotainment system responsive to the check field;
   wherein failure of the in-vehicle infotainment system is detected when the modified check field fails verification.

12. The system of claim 1, wherein the hardware module is one of an application specific integrated circuit (ASIC), a field programmable gateway array (FPGA), or a processor separate from the in-vehicle infotainment system that executes a fault tolerant operating system and application.

13. The system of claim 1, wherein the hardware module is further configured to:
   receive status information of the vehicle from a vehicle sensor, the status information specifying a gear in which the vehicle is operating; and
   display the streaming video from the video camera on the display in response to the vehicle being shifted into reverse gear when failure of the in-vehicle infotainment system is detected.

14. A method, comprising:
   receiving streaming video from a video camera of a vehicle;
   merging the streaming video with overlays from an in-vehicle infotainment system to create an overlaid streaming video by a hardware module;
   displaying the overlaid streaming video on a display in a cabin of the vehicle, the hardware module being separate from the in-vehicle infotainment system, the hardware module interposed between the video camera, the in-vehicle infotainment system, and the display;
   monitoring the in-vehicle infotainment system to detect failure of the in-vehicle infotainment system; and
   in response to detecting failure of the in-vehicle infotainment system, switching to displaying on the display in the cabin of the vehicle, the streaming video from the video camera and at least one overlay generated by the hardware module, the streaming video from the video camera and the at least one overlay generated by the hardware module displayed essentially simultaneously.

15. The method of claim 14, wherein the hardware module is one of an application specific integrated circuit (ASIC), a field programmable gateway array (FPGA), or a processor separate from the in-vehicle infotainment system that executes a fault tolerant operating system and application.

16. A machine-readable storage medium comprising computer-executable instructions which when executed cause at least one processor of a computing device, when operably connected to a video camera, an in-vehicle infotainment system, and a display, to:
   receive streaming video from the video camera of a vehicle;
   merge the streaming video with overlays from the in-vehicle infotainment system to create an overlaid streaming video by a hardware module;
   display the overlaid streaming video on the display in a cabin of the vehicle, the hardware module being separate from the in-vehicle infotainment system, the hardware module interposed between the video camera, the in-vehicle infotainment system, and the display;
   monitor the in-vehicle infotainment system to detect failure of the in-vehicle infotainment system; and
   in response to detecting failure of the in-vehicle infotainment system, switch to displaying on the display in the cabin of the vehicle, the streaming video from the video camera and at least one overlay generated by the hardware module, the streaming video from the video camera and the at least one overlay generated by the hardware module displayed essentially simultaneously.

17. The machine-readable storage medium of claim 16, wherein the hardware module is one of an application specific integrated circuit (ASIC), a field programmable gateway array (FPGA), or a processor separate from the in-vehicle infotainment system that executes a fault tolerant operating system and application.

18. The method of claim 14, wherein failure of the in-vehicle infotainment system is detected by incorrect formatting of display information generated by the in-vehicle infotainment system.

19. The method of claim 14, wherein failure of the in-vehicle infotainment system is detected when the in-vehicle infotainment system is detected to be unresponsive.

20. The method of claim 14, wherein failure of the in-vehicle infotainment system is detected when graphical information received from the in-vehicle infotainment system fails a quality check.

\* \* \* \* \*